Sept. 23, 1969     S. HANSEN     3,468,080
DIMENSION REGULATED STRUCTURAL STRUT
Filed Dec. 19, 1967     3 Sheets-Sheet 1
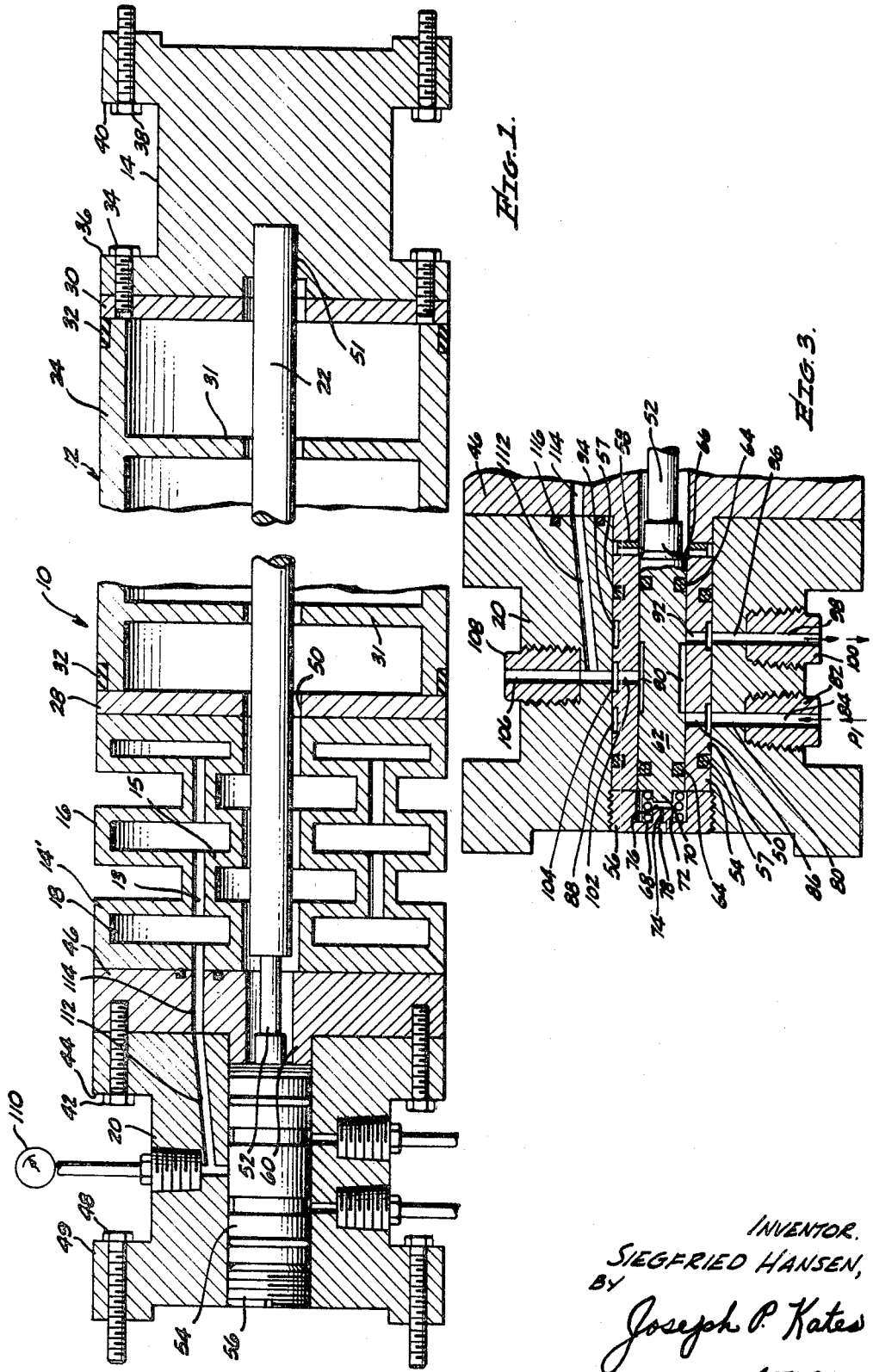
INVENTOR.
SIEGFRIED HANSEN,
BY
Joseph P. Kates
ATTORNEY.

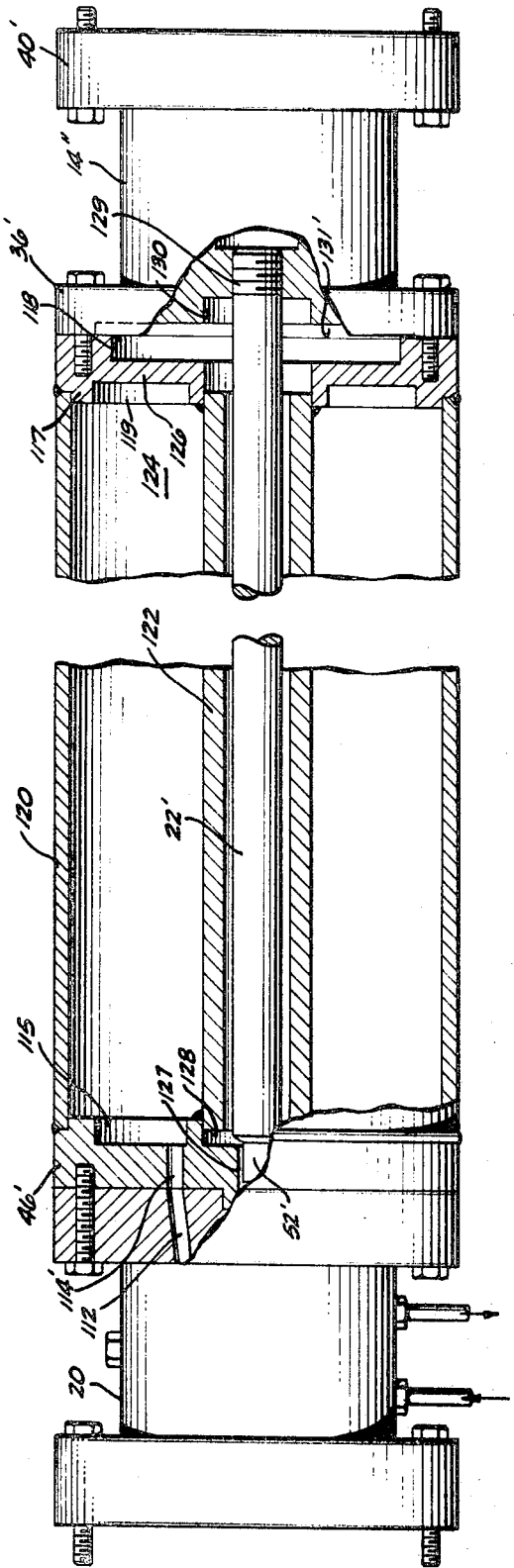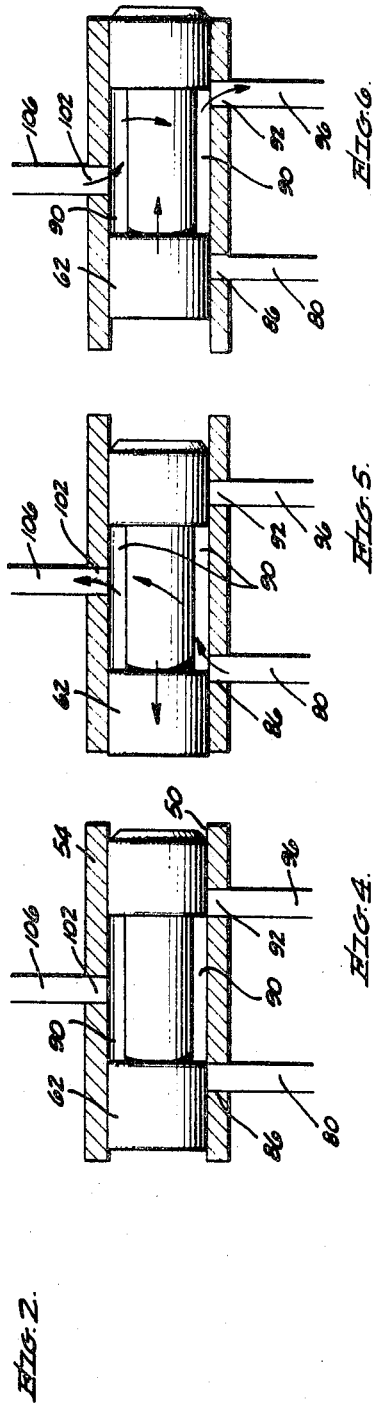

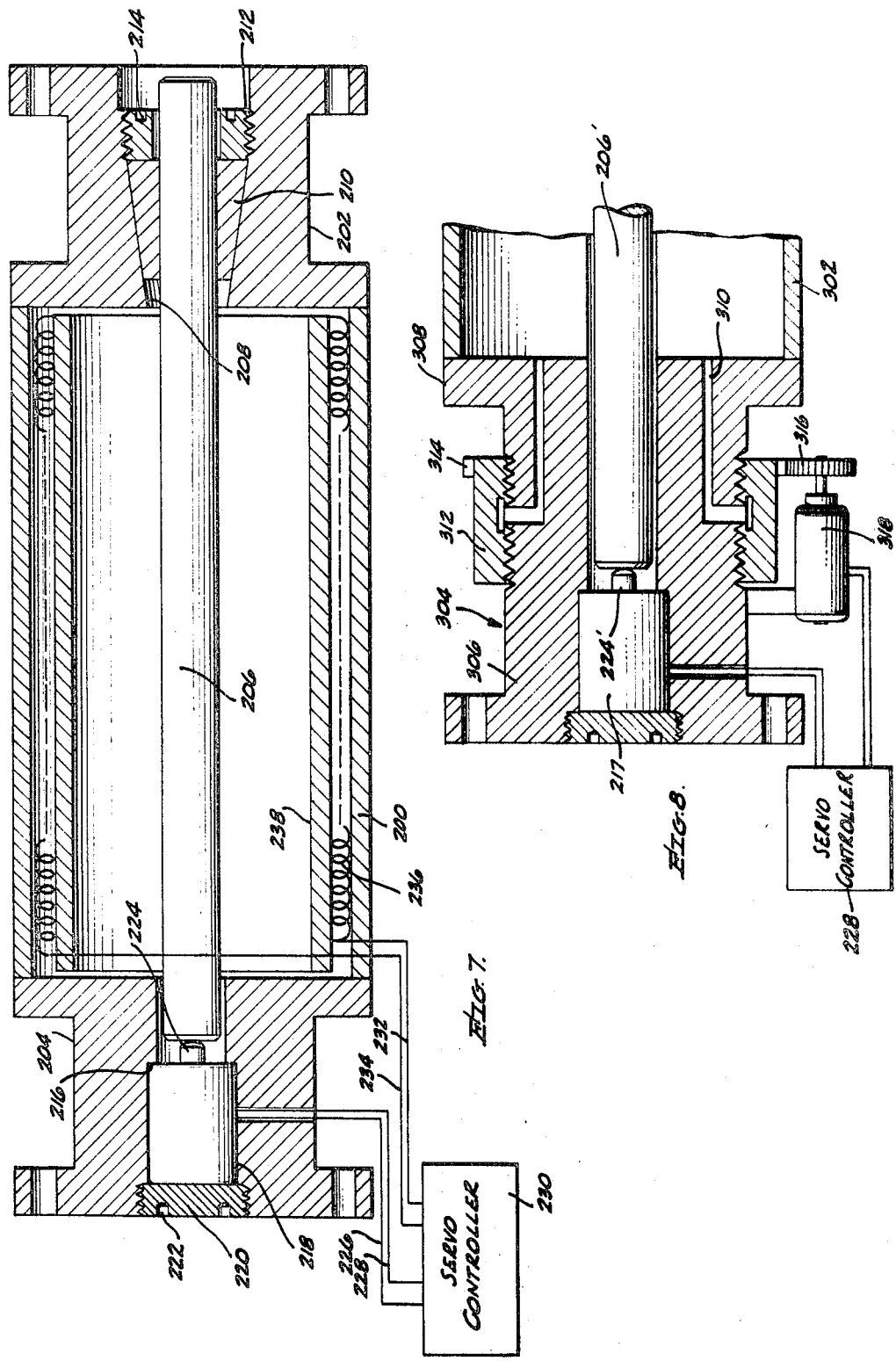

United States Patent Office 3,468,080
Patented Sept. 23, 1969

3,468,080
DIMENSION REGULATED STRUCTURAL STRUT
Siegfried Hansen, Los Angeles, Calif., assignor to Hughes Aircraft Company, Culver City, Calif., a corporation of Delaware
Filed Dec. 19, 1967, Ser. No. 691,776
Int. Cl. E04c *3/32;* G04b *17/20;* G01b *19/00*
U.S. Cl. 52—1
18 Claims

ABSTRACT OF THE DISCLOSURE

A structural strut having a particular dimension subject to dimensional variation due to changes in mechanical and wind loading, and temperature; a dimension standard element structurally embodied within the strut; and a hydraulic, electrical and/or heat or mechanically operated control system responsive to variatons of the particular dimension of the strut to regulate the length of an extensible and compressible portion of the strut whereby proportional relationship is maintained between the particular dimension of the strut and a reference dimension of the dimension standard element. The hydraulic embodiments responsive to dimension changes actuate a valve to unblock and block flow paths for fluid 14 under pressure to regulate the extensible and compressible portion length. The electrical embodiments employ a servo loop comprising a strain gage, controller and a heating unit or a mechanical screw advance assembly to regulate the extensible and compressible portion.

Background of the invention

The present invention relates to structural strut members and more particularly, to structural strut members integrally embodying a control system for automatically maintaining a particular dimension of the strut members at constant length.

The accuracy of many types of precision devices, such as, optical or radio telescopes, radar systems, supports for separated signal detection instruments for range determination by triangulation, and assorted devices utilizing a stable reference surface, such as, optical benches, is limited by the dimensional stability of the structural members forming support structures for such precision devices. It is common knowledge that the operating position of critical elements of such precision devices is subject to displacement resulting from dimensional variations of strut or support members utilized to support the critical elements. These displacements are primarily caused by variations in wind or mechanical loading, and dimensional changes of the support elements due to variations of ambient temperature. Essentially, the positional stability of such precision devices is principally affected by the extension and construction of the structural members forming the supporting structure. Hence, it is desirable that such structural elements include some provision for maintaining rigidity of the structural members of sufficient magnitude to be unaffected by variations in the loading of the members as may result from variable wind or mechanical loading and dimensional variations resulting from changes of ambient temperature.

Summary of the invention

Accordingly, one object of the present invention is the provision of a structural strut member which resists dimensional changes of the strut member as a result of variations in loading of the strut member.

Another object of the invention is the provision of a structural strut functioning to automatically compensate for loading variations affecting the dimensional stability of the strut member.

Still another object is to provide a controlled structural strut member wherein compensating means are incorporated to automatically maintain a dimension of the strut member substantially constant and the strut member or a configuration comprising one or more of the strut members of the invention sufficiently rigid for its intended function despite the variable loading effects resulting from changing mechanical loading or from variations of wind and temperature tending to distort the strut member(s).

The strut member of the present invention comprises an elongated body which is extensible or compressible or is provided with an extensible or compressible section including an integral chamber, an elongated dimensional standard housed within the elongated body of the strut member such that it is not subject to external forces which might change its dimensions, and a control system responsive to dimension changes of the elongated body of the strut relative to the length of the dimension standard element, to effect proportional changes to maintain the length of the strut member constant relative to the length of the dimension standard element. The control system may, for example, be hydraulic, electrical, pneumatic, or electronic and may, for example, include heating or mechanical adjusting elements. The hydraulic control system embodiment can effect changes of fluid pressure within a chamber responsive to ambient conditions to maintain constant strut member length relative to the standard member. Alternatively, in other embodiments, a servo system including a servo controller and responsive heating or mechanical adjustment means can be provided, for example. The means provided should not exert sufficient force against the ends of the standard to cause the dimension of the standard to change appreciably.

Brief description of the drawings

These and other objects and attendant advantages, features, and uses of the devices embodying the invention will become more apparent to those skilled in the art as a more detailed description proceeds when considered in conjunction with the accompanying drawings in which:

FIGURE 1 is a cross-sectional view, with a portion cut away for clarity of presentation, of a first preferred embodiment of the strut member of the present invention and employing a first hydraulic strut length control system;

FIG. 2 is a plan view partly cross-sectional, and with portions broken away for the sake of clarity, of a second preferred embodiment of the strut member of the present invention and employing a second modified hydraulic strut length control system;

FIG. 3 is an enlarged cross-sectional view of a portion of the hydraulic control system forming a part of the strut member shown in FIG. 1 and illustrating details of an attachment end member employable with the FIG. 1 and the FIG. 2 embodiments;

FIGS. 4, 5 and 6 are diagrammatic views showing various operating states of the hydraulic control system forming a part of the strut members shown in FIGS. 1, 2, and 3;

FIG. 7 is a cross-sectional view of a third preferred embodiment of the strut member of the present invention employing an electrical and thermal strut length control system; and FIG. 8 is a cross-sectional view, with portions identical to other preferred embodiments broken away and not shown for clarity in the presentation, of a fourth preferred embodiment of the strut member of the present invention employing an electrical and mechanical strut length control system.

Description of the embodiments

Refer to the drawings and more particularly to FIG. 1 depicts a first preferred embodiment of the dimension regulated structural strut of the present invention. A strut member 10 is provided. Strut member 10 is constructed of component parts comprising an elongated tubular body section 12; an attachment end member 14 secured to the right-hand end of the body section, as viewed in FIG. 1; an extensible bellows section 16 securely attached, as by weldments, to the opposite end of the body section and which includes an inner hydraulic chamber 18; a second attachment end member 20 firmly secured to the opposite side of the bellows section 16; an internally housed dimension standard rod 22; and a hydraulic system, primarily disposed within the attachment end member 20, for maintaining a constant proportional relationship between the operating length of the strut member 10 and the length of the standard rod 22.

As may be seen in FIG. 1, the elongated body section 12 is formed by a tubular body cylinder 24 having disc-shaped end caps 28 and 30 attached thereto in any suitable conventional manner, for example by the weldments 32. Optionally, the cylinder 24 may include suitable reinforcement formations, such as the radial ribs 31. The attachment end member 14 is secured to the body section 12 by any suitable means, such as threaded bolts 34 extending through apertures in an end flange 36 into threaded engagement with threaded apertures in the end cap 30. Additional threaded bolts 38 extending through apertures in the end flange 40 are provided for attachment of the strut to a device (not shown), forming no part of the present invention, to be supported by the strut member 10, or into interconnection with similar strut members or support structure as determined by the structural arrangement in which the strut member is utilized.

At its opposite end, the body section 12 is secured to thel extensible bellows section 16 in a conventional manner, such as, by welding. The length of the strut member 10 is completed by the attachment end member 20 which is secured by threaded bolts 42 extending through apertures in a flange 44 to threaded apertures in an annular connector plate 46, sealed to the bellows section 16. Bellows section 16 comprises outer bellows convolutions 14′ and inner bellows convolutions 15. The inside diameter of outer bellows convolutions 14′ is larger than the outside diameter of inner bellows convolutions 15 so as to define a composite bellows section 16 made up of inner bellows convolutions 15, outer bellows convolutions 14′ and an annular gap 13 between the inner and outer bellows convolutions 15 and 14′. The bellows section 16 may be formed of ⅛″ thick, heat rolled or stainless steel, or aluminum alloy material of the type usually used in aircraft, for example. Bolts 48 extending through apertures in the flange 49 are provided for connection of the strut to any suitable supporting base (not shown).

The dimension standard rod 22 is disposed in a central passage 50 of the strut which extends through the end caps 28 and 30, bellows section 16, connector plate 46 and the attachment ends 20 and 14. The dimension standard rod 22 is suitably secured at one end within a threaded central recess 51 (not fully shown in FIG. 1), in the attachment end 14. Suitable securing or fixing of rod 22 at said one end may be effected, for example, by the above-exemplified means of threading the rod 22 along the fixed end (grinding the threads if a quartz rod is used) and providing a threaded aperture to receive the threaded end, or by providing a chuck (not shown) in the attachment end member 14 to hold the fixed end of rod 22. Thread, chuck, or other means enabling semipermanent adjustment of the position of the fixed end of rod 22 are preferably used. The rod 22 extends from its secured end in attachment end 14 in free support through the central passage 50. This arrangement for supporting the standard rod 22 in free support within the central passage 50 permits relative motion between the standard rod 22 and the other elements of the strut member 10 as the strut 10 reacts to variation in loading and temperature and the corresponding corrective changes in the length of the strut as effected by a hydraulic control system, in a manner to be described. The housing of dimension standard rod 22 within the central passage 50 of the strut 10 shields the dimension standard rod 22 from external forces which might otherwise effect a change of dimensions of the standard rod 22.

The material of standard rod 22 should be selected so that changes in the length of the standard rod 22 due to temperature variations will be minimized. Two suitable materials of desirable parameters for rod 22 are fused quartz or an iron-nickel alloy containing about 36 percent nickel and having a coefficient of linear expansion of approximately 0.000001 inch per inch per degree centigrade at ordinary temperatures and sold under the trademark Invar since these materials have very desirable coefficients of thermal expansion. At its free end, the standard rod 22 is equipped with a probe end 52 of reduced diameter which extends through the connector plate 46 into engagement with elements of the hydraulic system, referred to above, disposed in the attachment end 20.

Basically, the hydraulic control system for regulating the length of the strut 10 comprises a valve arrangement disposed within the attachment end 20 which is operated in response to relative movement between the free probe end 52 of the standard rod 22 and the remaining elements of the strut member 10 to control the flow of hydraulic fluid supplied from a conventional source of fluid under pressure, exterior of the strut 10 and not shown in the drawing, and the hydraulic chamber 18 within the bellows section 16. Hydraulic chamber 18 is the entire space between the inner and outer bellows convolutions 15 and 14′ and includes the annular gap 13 to enable the hydraulic fluid to be applied in the space between the outside of the inner bellows 15 and the inside of the outer bellows 14′ in the operation to be described herein below. The hydraulic fluid used may be the conventional fluid used for hydraulic systems and will be chosen in accordance with the particular application of the invention.

As shown in greater detail in FIG. 3, the portion of the hydraulic system contained internally of the attachment end 20 includes a hollow cylinder 54 which is adjustable along the length of the central passage 50 of the attachment end 20 by means of an adjustment cap screw 56 and is maintained in sealed relation therewith by conventional O-ring seals 57. As the cap screw 56 is rotatively adjusted the cylinder 54 can be adjusted to different axial positions along the central passage 50 and held in the adjusted positions by the force of a corrugated spring washer 58 which is interposed between one end of the cylinder 54 and an annular projection 60, see FIG. 1, protruding into the passage 50 from the connector plate 46. An elongated cylindrical spool valve 62 is slideably disposed within the cylinder 54 and is sealed against leakage of fluid by means of a pair of O-ring seals 64. The spool valve 62 is provided with a protruding end 66 which is caused to bear against the probe end 52 of the standard rod by means of a helical spirng 68 disposed on a projection 70 at the opposite end of the spool valve 62. The other end of the helical spring 68 is disposed on a similar projection 72 on the cap screw 56. Projection 72 is additionally provided with a fluid venting duct 74 that communicates between the cavity 76 between the cap screw 56 and the spool valve 62 and the adjustment slot 78 of the cap screw 56 to vent fluid that may be entrapped under pressure within the cavity 76.

The attachment end 20 is provided with a fluid entrance port 80 which is connected at its outer end by means of ferrule 82 and fluid passage or line 84 to a conventional source of hydraulic fluid (not shown), designated, $P_1$. The supply line pressure will be dependent upon a system requirements and may be a source of fluid under 3000 pounds per square inch pressure, for example. The interior end of the passage 80 communicates with a passage 86 extending through the cylinder 54 which is effectively widened by an annular recess 88 on the outside wall of the cylinder 54 thereby permitting communication between the passages 80 and 86 for all adjusted positions of the cylinder 54. The passage 86 is positioned to communicate with an annular recess 90 centrally located on the spool valve 62. Similarly, the cylinder is provided with a fluid discharge passage 92 having a similar recess 94 communicating between the recess 90 of the spool valve and a fluid discharge passage 96 extending between the central passage 50 of the attachment end and a ferrule 98 connected to a fluid discharge passage or line 100 leading to an exhaust fluid reservoir, not shown. The pressure of the reservoir will also be in accordance with system operational requirements, for example, for operation under atmospheric ambient conditions the exhaust reservoir will be the atmosphere or will be at atmospheric pressure. The opposite side of the cylinder 54 is provided with a passage 102 communicating with a wider annular recess 104 on the outside surface of the cylinder 54 and the annular recess 90 of the spool valve 62. Annular recess 104 is of sufficient width to communicate, for all adjusted positions of cylinder 54, with a fluid passage 106 extending through the attachment end 20. At its exterior side, the passage or line 106 is connected to the passage or line (not numbered) leading into a standard fluid pressure gauge 110, these passages or lines being secured in position by means of a ferrule 108. Additionally, intermediate its ends, the passage 106 is connected by a fluid passage 112 which communicates with a passage 114 extending through the connector plate 46 into direct communication with the bellows chamber 18. The passages 112 and 114 are sealed against leakage by means of a conventional O-ring seal 116.

A second embodiment of a strut member utilizing the principles of this invention is shown in FIG. 2. This embodiment operates in substantially the same manner as the embodiment in FIGS. 1 and 3 and will be described in conjunction with FIGS. 4, 5, and 6. However, the expansible section of the strut differs in construction from that identified as body section 12 and bellows section 16 in FIG. 1. As shown in FIG. 2 the composite body section and expansible bellows section is formed by concentric cylinder body members 120 and 122, which define an elongated annular fluid chamber 124 formed in the annular space between the outer cylinder 120 and the inner cylinder 122. At their right-hand end, as viewed in FIG. 2, the cylinders 120 and 122 are sealed, as by welding to an end cap 126 similar to the end cap 30 of the embodiment shown in FIG. 1. At their other ends, the cylinders 120 and 122 are directly connected in sealed relation, as by welding, to the connector plate 46'. The remaining elements forming the strut of this embodiment are identical to those in conjunction with the embodiment shown in FIG. 1, and the FIG. 2 embodiment employs the hydraulic control system means illustrated in FIG. 3 in detail (except that the connector plate 46' is preferably employed in the FIG. 2 embodiment rather than the connector plate 46 of FIG. 1).

The body cylinders 120 and 122 are formed from suitable metallic materials having elastic properties, such as various grades of steel or other elastic metals. Hence, forces affecting the normal operating length of the strut member shown in this embodiment are reflected in expansion or contraction of the material forming the concentric cylinders. Accordingly, it can be seen in FIG. 2 that the fluid of the hydraulic control system (see FIG. 3) will be in direct communication with the chamber 124 through fluid passage 112 and through the inlet passage 114' and annular recess 115 in the connector plate 46' (which together take the place of inlet passage 114 of FIG. 3) and will cause elongation or permit contraction of the length of the strut according to variations of the fluid pressure. The attachment and member 20 of FIGS. 1 and 3 could be employed with the annular connector plate 46 of FIGS. 1 and 3 in the FIG 2 embodiment. However, as shown, preferably for reasons of economy and facilitating construction the annular connector plate 46' of FIG. 2 terminates as passage 114' corresponding to passage 114 of FIG. 3 together with an annular recess 115 which connects into the elongated annular fluid chamber 124.

The initial adjustment of the fluid control system of this embodiment is identical with that to be described in conjunction with FIGS. 4, 5, and 6. It is to be understood, that the portion of the initial fluid pressure within the chamber 124 of a value equal to ½ of the source pressure, $P_1$, will cause longitudinal expansion of the cylinder walls 120 and 122. With this initial arrangement, it is apparent that subsequent elevations of fluid pressure within the chamber 124 which are higher than ½ $P_1$ will cause further lengthening of the cylinders 120 and 122, and, conversely, the introduction of pressures to the chamber 124 less than ½ $P_1$ (will cause contraction of the cylinders 120 and 122 from their initial state.

While in nowise to be considered as limiting the invention, in one practical example of the FIG. 2 embodiment (which employs the attachment end member 20 of FIG. 3), the outer cylinder 120 is a 3.0 inch (3.0") outside diameter, 35.825" long, ⅛ thick aluminum cylinder; the inner cylinder 122 has a ¾" outside diameter and is of the same thickness, length and material as outer cylinder 120; annular connector plate 46' may be 1.255" long with a .250" long, 2.75" diameter flange portion for welding to cylinder 120, and a .255" longs, .687" diameter dimension boss or annular projection (not shown but identical to annular projection or boss 60 of FIG. 1) which interfits into end member 20 and contains a standard dimension rod probe retaining .375" diameter aperture 127 therethrough and a .755" diameter, .5" deep counterbore 128. Counterbore 115 is structured as an annular, ring-shaped, 2" outer diameter, 1" inner diameter relief counterbore concentric with the .755" diameter bore 128 for connection into the fluid chamber 124 via the aperture 114'. In this example, end cap 126 has a 3" outer diameter, a reduced 2.75" diameter welding boss 117, a .750" aperture (not numbered) into which an end of cylinder 122 is disposed, a 1.5" diameter counterbore 118, and an annular ring-shaped recess 119 .5" deep and from 1" to 2" diameter adjacent the fluid chamber 124. The exemplified end cap 126 (see FIG. 2) and annular connector plate 46' are formed of 4130 steel material and are suitably welded to the cylinder 120. The shaft of spool valve 62 (see FIG. 3) is formed of 440C stainless steel, is 2.106" long, the diameter of projection 70 is .187" and its length is .1", the annular recess 90 is .5" long, with a .272" outside diameter reduced shaft portion (not numbered). The spool valve 62 shaft outside bearing diameter is .3125". The dimension standard rod 22' is formed of Invar material, .5" outside diameter and 38.750" long, is threaded with ½", (N.E.F.) threads 129 at one end for threadedly retaining the fixed end of rod 22', and has a .250" outside diameter, 75" long reduced section which forms the free end probe 52'. Hollow cylinder 54 (see FIG. 3) is formed of 440C stainless steel, with a .3125" aperture (not numbered) therethrough, a .6875" outside diameter and is 1.625" long. The adjustment cap screw 56 has a ¾" outside diameter, threaded with 32 threads per inch, is .27" long and is formed of 440C stainless steel material. The attachment end member 20 is 2.312" long with a .6875" diameter .312" deep, bore therethrough threaded at one end with 32 threads per inch (not numbered) into which the adjustment cap screw 56 is threadedly engaged. Attachment end member 20 is formed of 4130 steel material, its flanges 44 and 49 are each ½" long, and member 20 has an inner 1.187" long reduced diameter portion through which are bored the tapered and pipe threaded apertures which receive the ferrules 82, 98 and 108 in threaded engagement. The attachment end member 14" has a .625" long end flange 36' for attachment to the end cap 126, a 5" end flange 40' at the other end, a threaded aperture (not numbered) to receive the fixed threaded end 129 of standard dimension rod 22', a 1" diameter counterbore 130 and a 2" diameter counterbore 131'. A 1.5" long, .75" diameter counterbore (not shown) is provided at the end opposite the end cap 126 attached end. The reduced outside diameter section of attachment end member 14" is 1.187" long and 2" in diameter.

Operation

The operation of the embodiments shown in FIGS. 1, 2, and 3 can best be described with reference to the operational diagrams shown in FIGS. 4, 5, and 6. FIG. 4 depicts the position of the spool valve 62 relative to the fluid passages 80, 106, and 96 when the strut member is extended to its normal operating length. In FIG. 5, the valve spool is shown in the position it would assume relative to passages 80, 106, and 96 when the application of external forces such as wind or a decrease in ambient temperature tends to shorten the strut member from its normal operating length. FIG. 6 shows the position of the valve spool relative to the passages 80, 106, and 96 when the strut member 10 tends to assume a length greater than its normal operating length which may occur when wind loading is such as to extend the strut member 10 or the strut member 10 experiences an elevation of temperature.

As shown in FIG. 4, when the strut 10 is disposed at its normal operating length both the input 80 and and fluid discharge passage 96 are shut off by the body of the spool valve 62 from the annular recess 90 around the spool valve 62 which is in continuous comunication with the passages 102 and 106 leading to the internal hydraulic chamber 18 of the strut member 10. The position of the spool valve 62 as shown in FIG. 4 is initially obtained by adjustment of the cap screw 56 until the pressure gage 110 indicates a fluid pressure within passage 80 and hence within the chamber 18 which is equal to one-half the source of pressure, $P_1$, plus a pressure designated, $P_c$, which is related to the spring stiffness of the bellows assembly forming the chamber 18. Adjustment of the cap screw 56 causes the spool valve 62 to assume this indicated position with opposing forces of the springs 58 and 68.

When the compressive loading on the strut member 10 increases, which, as previously stated, may result from a compressive force on the strut because of a change in wind loading or a decrease in the ambient temperature, the strut member 10 tends to shorten and the attachment end cap 20 will move relatively toward the right as viewed in FIG. 5. As indicated by the arrow in passage 86 and recessed fluid passage 90 in FIG. 5, this movement will bring the passages 80 and 86 into communication with the recessed fluid passage 90 central of the spool valve. It will be noticed that the drain passages 92 and 96 are displaced to a point more remote with respect to the passage 90 than shown in FIG. 4. Since the full force pressure $P_1$ (more than normal length of strut pressure) is supplied to passage 80, fluid of higher pressure than that contained in the chamber 18 will flow through the passages 102 and 106 and hence through passages 112 and 114 into chamber 18 to affect expansion of the chamber 18. When the chamber 18 is expanded a sufficient degree the attachment end 20 will be displaced to the left as viewed in FIG. 4 until the normal operating length of the strut member 10 is attained at which time the relative positioning of the spool valve 62 and passages 80, 106, and 96, shown in FIG. 4, again will be obtained.

If on the other hand, the strut member 10 tends to lengthen, as a result of a reduction in the loading of the strut member or elongation of the strut member 10 due to an increase in the ambient temperature, movement of the attachment end 20 will be such as to effect communication between the drain passage 96, valve spool passage 90, and the passage 106 leading to the chamber 18 in reverse of the path described to permit escape of fluid through the drain passage 96. This escape of fluid will continue until the valve spool and passages 80, 106, and 96 will attain the relative positions, shown in FIG. 4, with respect to the recessed passage 90 on the spool valve 62.

By virtue of the above described mode of operation, it is seen, that the length of the strut member element will be maintained at its operational length as shown in FIG. 4.

The operation of the FIG. 2 embodiment is similar to that of the FIG. 1 embodiment except that the passage of hydraulic fluid is through fluid passage 112 (see FIG. 3), passage 114' instead of passage 114 of FIG. 1, the annular recess 115 and chamber 124. The structure and materials of the members defining chamber 124 enable compression and expansion compensation as is effected by the bellows 16 in the FIG. 1 embodiment.

FIG. 7 shows a further modification of the present invention. Basically, this construction is similar to that shown in FIG. 2 in that it utilizes a steel or other suitable metallic tubular member 200 which is suitably attached, as by welding, to the attachment members 202 and 204. The fused quartz or Invar standard rod 206 is attached to the top end attachment member 202 by means of a collet construction. This construction is formed by a tapered aperture 208 that extends through the end member 202 and is dimensioned to receive a wedge shaped sleeve 210 which is forced into place to be compressed between the standard rod 206 and the tapered aperture 208 by means of a threaded washer 212 which is provided with tool engaging recesses 214 utilized to tighten the washer. The bottom or base attachment and piece 204 is provided with a recess 216 which receives a standard strain gage 218 that is secured by means of a threaded washer 220 similarly equipped with similar tool engaging recesses 222. As may be seen in FIG. 7, the strain gage is fixed in position with respect to the end member 204 and is provided with a plunger 224. With this arrangement expansion or contraction of the combined end attachment members 202, 204 and the body member 200 as a result of ambient temperature changes and/or the application of compressive or tensile forces on the strut member 200 causes the plunger 224 to move relatively in a reciprocating manner selectively against or away from the end of the fused quartz or Invar standard rod 206.

The strain gage 218 is of standard construction, for example of the type available from the Baldwin-Lima-Hamilton Electronics Division, Waltham, Mass., a division of Armour and Company, and is capable of delivering a fixed output as adjusted in the initial setup of the device and will provide a higher or lower output depending upon movement of plunger 224 as a result of the change of the strut length. This output is applied through the conductors 226 and 228 to a conventional servo controller 230 to regulate the supply of electrical power to the conductors 232 and 234, and hence the heater unit 236 which is supported about the outer surface of a tubular insulated core member 238. The heater should be insulated both electrically and thermally. The material of core 238 may be such as to perform both functions. Alternatively core 238 may be formed of a thermal insulating material, for example, material formed of glass fiber such as that known as Fiberglas and a separate electrical insulating laminate may be provided on or adjacent the core or else the heater wire may be surrounded or sleeved with electrical insulating material.

Also, merely by way of example and not to be construed as limiting the invention, servo controller 230 may be a D.C. servo controller rated at 28 volts D.C. supply voltage, output ±122 volts, 5 amperes. Such a servo controller is obtainable from the Melcor Electronics Corporation, Farmingdale, Long Island, and sold under the designation Melcor, Model 1561.

Operation

The strut shown in FIG. 7 operates in the following manner. When the strut is initially set up the servo controller is adjusted so that the initial electrical output of the strain gage causes the controller to transmit a fixed amount of power to the heater unit 236 to maintain the length of the strut at a fixed standard length. When thermal changes or mechanical load changes cause the strut to shorten, the plunger 224 will be depressed thereby causing an increased electrical signal to be fed through the lines 226 and 228 to the servo controller 230. This in turn will cause the controller to provide additional electrical power to the conductors 232 and 234 to the heater unit 236 to supply sufficient heat to the steel tube member 200 to cause the strut to assume its standard length. If, on the other hand, thermal or physical forces cause the strut unit to lengthen, the output of the strain gage 218 will be such as to cause the servo controller to provide less heating power to the heater unit 236 thereby permitting the steel tube 200 to contract or shorten to the standard length.

Still another form of the invention is shown in FIG. 8. The top attachment end (not shown) is identical to attachment end 202 shown in FIG. 7. The tubular body member 302 is the same as tubular body member 200 shown in FIG. 7 and is suitably attached, as by welding to the top end attachment member (not shown). A lower attachment end 304 is provided. Tubular body member 302 is also suitably attached, for example, by welding, to the lower attachment end 304.

In this modification the attachment end 304 comprises a pair of telescopically engaged tubular members 306 and 308 which are joined by a conventional splined connection 310 to prevent relative rotation of the members. The members 306 and 308 are provided with reverse threads relative to each other whereby rotation of nut 312 threaded therearound causes the members to move towards each other with one direction of rotation of the nut 312 and to move away from each other when the nut 312 is rotated in the opposite direction. The nut 312 is provided with a ring gear 314 which is driven by a pinion gear 316 of the gear motor 318. The strain gage 217 may be identical to strain gage 218 of FIG. 7, e.g., of the unbonded type comprising a bridge circuit of fine wire which under tension caused by movement of plunger 224' changes its electrical resistance.

Operation

As the strut member of FIG. 8 lengthens or shortens, the plunger 224', responsive to the moving away or advancing toward it of the standard rod 206', moves accordingly. This causes the strain gage 217, which may be a conventional midpoint null type gage, to supply a signal to the servo controller 228 of the proper phase and magnitude to drive the gear motor 318 in the proper direction to advance or retard ring gear 314 and hence nut 312 so as to maintain the strut 300 at its standard length.

It should be clear that in each of the embodiments herein illustrated the control device or sensor, as that of the hydraulic system within extension member 20 of the FIG. 1 and 3 embodiments, or the strain gage 218 of FIG. 7 or 217 of FIG. 8, are of the type that do not require large force in operation (present low mechanical impedance) so that the sensors will not affect the length of the standard dimension rods 22, 22', 206 or 206'. Although the standard dimension rods 22, 22', 206 or 206' have a low coefficient of expansion with increase in temperature, they are susceptible to dimension variation upon application of appreciable external forces and so that sensors or control devices which are required to be in contact with the rods must be of a low frictional impedance type to avoid affecting the dimensions of the standard rod 22, 22', 206 or 206'.

It is apparent that the different embodiments of the strut member of this invention, as described above may be utilized as unitary support or structural elements. In the latter case, a single strut may constitute one of a plurality of similar strut members forming a support leg of supporting framework.

While each embodiment of FIGS. 1 and 2 of the present invention have been described as being hydraulically operated, it is to be understood that their operations can readily be made pneumatic within the preference of one skilled in the art.

While salient features have been illustrated and described with respect to particular embodiments, it should be readily apparent that modifications can be made within the spirit and scope of the invention, and it is therefore not desired to limit the invention to the exact details shown and described.

What is claimed is:

1. A supporting strut resistant to change in dimensions when subjected to an encountered range of changing ambient temperatures and externally applied forces, comprising:
   a rod formed of material which maintains substantially constant dimensions over the encountered range of said ambient temperatures;
   an extensible and compressible portion; and
   means responsive to change of dimensional relationship between said strut and said rod to apply force of magnitude and direction to said extensible and compressible portion to substantially restore the dimensional relationship between said strut and said rod.

2. The strut of claim 1 wherein said strut further comprises a housing means to shield said rod such that said rod is exposed to no more than negligible externally applied dimension change producing forces, and wherein said housing includes said extensible and compressible portion.

3. The strut of claim 2 wherein said responsive to change means further comprises sensor means in juxtaposition to the end of said rod of mechanical impedance below that which would exert a force on said rod sufficient to appreciably change the length of said rod.

4. An elongated structural support member having a normal structural length, subject to variation in response to changes in mechanical and wind loading and temperatures, which comprises:
   an elongated body member having a first and second end and a normal structural length and including an extensible section extending along at least a portion of said structural length whereby the length of said body member can be varied;
   a dimension standard element of subtsantially constant standard length with relation to said normal length, said standard element having one end fixed with respect to said first end of said body member and a free end disposed in free support adjacent said second end of said body member;
   control means disposed in a constant spatial relation to the free end of said standard element;
   regulating means actuated in response to said control means and responsive to variations of said body member length with respect to said standard element length to cause said extensible section to vary in length in a direction to restore said body member length to said body member normal structural length.

5. The structural support member of claim 4 wherein said control means comprises a strain gage.

6. The structural support member of claim 5 wherein:
   said strain gage further comprises means to provide signal output in accordance with said body member length; and
   said regulating means comprises a heater unit disposed adjacent to said extensible section and a servo controller actuated in response to said signal output from said strain gage to vary the temperature of said heater unit.

7. The structural support member of claim 5 wherein:
   said regulating means comprises said second body member end and wherein said second body member end comprises a pair of splined mating members having threads;

a threaded member having threads in reverse direction engagingly connected with said splined mating members whereby when said threaded member is rotated in one direction said splined mating members will move toward each other and when said threaded member is rotated in the opposite direction said splinde mating members will move apart from each other.

8. The structural support member of claim 7 wherein said regulating means further comprises:
a motor;
a servo controller responsive to said strain gage to actuate said motor;
means to connect said motor to rotate said threaded members in response to actuation of said servo controller.

9. The structural support member of claim 4 wherein:
said regulating means comprises means to regulate flow of a fluid under pressure; and
said control means comprises a valve responsive to said variations of said body member structural length with respect to said standard element length to control the flow of said fluid.

10. The structural support member of claim 9 wherein said dimension standard element is a low linear temperature coefficient of expansion material made of fused quartz.

11. The structural support member of claim 9 wherein said dimension standard element is a low linear temperature coefficient of expansion material made of an iron nickel alloy of approximately 36% nickel.

12. The structural support member of claim 9 wherein:
said extensible section includes an internal fluid chamber for lengthening and shortening said extensible section in response to the magnitude of fluid pressure within said chamber, said chamber having a common fluid entrance and discharge passage;
said regulating means includes a fluid inlet passage from a source of fluid under pressure and a fluid venting passage connected to a fluid reservoir of less fluid pressure than said source; and
said valve includes a fluid passage connecting the interior of said fluid chamber through said common passage to said inlet passage, when the length of said body member is less than said normal length, and to said venting passage when the length of said body member is greater than said normal length.

13. The structural support member of claim 12 wherein:
said body member includes a central passage extending longitudinally of said body member from said second end;
said common entrance and discharge passage and said inlet and vent passages being disposed integrally within said second end of said body member and communicating with said central passage; and
said valve comprising a spool valve disposed in said central passage.

14. The structural support member of claim 12 wherein:
said extensible section comprises a resilient bellows; and
said fluid chamber comprises a cavity within said bellows for expanding and contracting said bellows in response to the pressure of fluid within said cavity.

15. The structural support member of claim 13 wherein said body member comprises coaxially disposed inner and outer cylinders having elastic walls forming an annular cavity therebetween defining said fluid chamber.

16. The structural support member of claim 15 further comprising:
an adjustment cylinder interposed between the wall of said central passage and said valve having passages communicating between said common, inlet and outlet passages and the fluid passage of said valve whereby the flow of fluid between said passages can be adjusted by longitudinal movement of said adjustment of cylinder with respect to said passages; and
adjustment means in said central passage for adjusting the relative longitudinal positions of said adjustment cylinder with respect to said valve.

17. An elongated structural support having a normal structural length defined by the composite lengths of an elongated tubular body member and a variable length resilient bellows section connected at one end to a first end of said body member and having an interior annular shaped fluid chamber whereby the length of the bellows section is varied in proportion to the pressure of fluid within said chamber;
a first attachment end cap secured to a second end of said body member;
a rod of a standard length formed of material to maintain its rod dimensions substantially constant over a wide range of ambient temperatures, said rod having one end coaxially connected to said end cap and having a probe end extending coaxially in free support through said tubular body member and through a central sealed opening extending centrally through said bellows section;
a second attachment end cap secured to the free end of said bellows section having a central longitudinal passage coaxially communicating with said sealed opening of said bellows section;
a fluid pressure regulating system disposed in said second end cap comprising a common fluid entrance and discharge passage connecting said central passage and the interior of said bellows fluid chamber, and separate fluid inlet and outlet passages communicating between said central passage and an exterior surface of said second end cap to permit connection of said inlet passage to an external source of fluid under pressure and said outlet passage to an exhaust fluid reservoir of substantially less pressure than said source;
control means for said regulating system comprising a cylindrical valve coaxially disposed in said central passage and abutting said probe end of said standard rod; and including a circumferential fluid passage on said valve continually communicating with said common entrance and discharge passage, and communicating with said inlet passage only when said support body is contracted to a length less than said normal length, and communicating with said outlet passage only when said support body is extended to length greater than said normal length;
an adjustment cylinder interposed between the wall of said central passage and said valve having passages communicating between said common, inlet and outlet passages and the fluid passage of said valve whereby the flow of fluid between said passages can be adjusted by longitudinal movement of said adjustment cylinder with respect to said passages; and
adjustment means in said central passage for adjusting the relative longitudinal positions of said adjustment cylinder with respect to said valve.

18. An elongated structural support comprising:
inner and outer coaxially disposed tubular body members of elastic material defining an elongated annular fluid chamber therebetween, said body member having a normal structural length;
a first attachment end cap secured to a first end of said body members in sealed relation to said fluid chamber;
a second atachment end cap secured to a second end of said body members in sealed relation to said fluid chamber, said second end cap including a central passage extending therethrough in coaxial alignment with the interior bore of said inner body member;
a rod of a standard length formed of material which maintains rod dimensions substantially constant over a wide range of ambient temperatures, said rod having one end coaxially connected to said first end cap and having a probe end extending coaxially in free support through said inner body member into the central passage of said second end cap;

A fluid pressure regulating system disposed in said second end cap comprising a common fluid enrtance and discharge passage connecting said central passage and the interior of said fluid chamber, and separate fluid inlet and outlet passages communicating between said central passage and an exterior surface of said second end cap to permit connection of said inlet passage to an external source of fluid under pressure and said outlet passage to an exhaust fluid reservoir of substantially less fluid pressure than said source;

control means for said regulating system comprising a cylindrical valve coaxially disposed in said central passage and abutting said probe end of said standard rod; and including a circumferential fluid passage on said valve communicating with said common entrance and discharge passage, and communicating with said inlet passage only when said support body is contracted to a length less than said normal length, and communicating with said outlet passage only when said support body is extended to a length greater than said normal length;

an adjustment cylinder interposed between the wall of said central passage and said valve having passages communicating between said common, inlet and outlet passages and the fluid passage of said valve whereby the flow of fluid between said passages can be adjusted by longitudinal movement of said adjustment cylinder with respect to said passages; and adjustment means in said central passage for adjusting the relative longitudinal positions of said adjustment cylinder with respect to said valve.

References Cited

UNITED STATES PATENTS

| | | | |
|---|---|---|---|
| 2,995,911 | 8/1961 | Wenrich | 66—114 |
| 3,170,122 | 2/1965 | Bennett | 331—94.5 |
| 3,203,141 | 8/1965 | Musser | 52—1 |

FRANK L. ABBOTT, Primary Examiner

PRICE C. FAW, JR., Assistan Examiner

U.S. Cl. X.R.

33—125; 52—573, 720; 58—133

UNITED STATES PATENT OFFICE
CERTIFICATE OF CORRECTION

Patent No. 3,468,080      Dated September 23, 1969

Inventor(s) Siegfried Hansen

It is certified that error appears in the above-identified patent and that said Letters Patent are hereby corrected as shown below:

Col. 1, line 17, "variatons" should be --variations--.
Col. 3, line 34, "thel" should be --the--;
       line 75, after "strut" insert --10--.
Col. 4, line 56, "spirng" should be --spring--;
       line 68, after "upon" delete "a".
Col. 6, line 14, delete "(";
       line 25, "longs" should be --long--.
Col. 7, line 73, after "18" insert --. This condition will cause fluid to flow from the Chamber 18--.
Col. 10, line 22, "force" should be --forces--.
Col. 11, line 7, "splinde" should be --splined--.
Col. 12, line 69, "atachment" should be --attachment--.

SIGNED AND SEALED
MAR 9 1971

(SEAL)
Attest:

Edward M. Fletcher, Jr.
Attesting Officer

WILLIAM E. SCHUYLER, JR.
Commissioner of Patents